(12) United States Patent
Pande et al.

(10) Patent No.: US 7,741,994 B2
(45) Date of Patent: Jun. 22, 2010

(54) IONOSPHERIC ERROR PREDICTION AND CORRECTION IN SATELLITE POSITIONING SYSTEMS

(75) Inventors: Ashutosh Pande, Noida (IN); Junichi Suzuki, Hirakata (JP)

(73) Assignee: SiRF Technology Inc., San Jose, CA (US)

( * ) Notice: Subject to any disclaimer, the term of this patent is extended or adjusted under 35 U.S.C. 154(b) by 0 days.

(21) Appl. No.: 10/504,233

(22) PCT Filed: Feb. 13, 2003

(86) PCT No.: PCT/US03/04314

§ 371 (c)(1),
(2), (4) Date: Mar. 2, 2005

(87) PCT Pub. No.: WO03/069366

PCT Pub. Date: Aug. 21, 2003

(65) Prior Publication Data

US 2005/0146461 A1     Jul. 7, 2005

Related U.S. Application Data

(60) Provisional application No. 60/357,157, filed on Feb. 13, 2002.

(51) Int. Cl.
*G01S 19/07* (2010.01)
(52) U.S. Cl. .............................. 342/357.02; 342/357.09
(58) Field of Classification Search ............ 342/357.03, 342/357.09
See application file for complete search history.

(56) References Cited

U.S. PATENT DOCUMENTS

| | | | | |
|---|---|---|---|---|
| 5,323,322 | A * | 6/1994 | Mueller et al. | 701/215 |
| 5,428,358 | A * | 6/1995 | Gardner | 342/26 D |
| 5,731,786 | A * | 3/1998 | Abraham et al. | 342/357.08 |
| 5,828,336 | A * | 10/1998 | Yunck et al. | 342/357.02 |
| 6,040,798 | A | 3/2000 | Kinal et al. | |
| 6,229,478 | B1 * | 5/2001 | Biacs et al. | 342/357.03 |
| 6,285,315 | B1 * | 9/2001 | Pratt | 342/357.09 |
| 6,324,473 | B1 * | 11/2001 | Eschenbach | 701/215 |
| 6,356,232 | B1 * | 3/2002 | Rocken et al. | 342/357.02 |
| 6,397,147 | B1 * | 5/2002 | Whitehead | 701/213 |
| 6,529,830 | B1 * | 3/2003 | Eschenbach | 701/215 |
| 6,701,253 | B2 * | 3/2004 | Edwards et al. | 701/214 |

FOREIGN PATENT DOCUMENTS

EP      1046924 A2 * 10/2000

OTHER PUBLICATIONS

Bishop, Gregory et al, "Algorithms that Use the Ionosphere t Control GPS Errors," IEEE PLANS 1996, Apr. 1996, pp. 145-152.*
Batchelor. A. et al, "Ionospheric Delay Estiamtion in the European Global Navigation Overlay," IEEE 1996, pp. 3/1-3/6.*

(Continued)

*Primary Examiner*—Gregory C Issing
(74) *Attorney, Agent, or Firm*—RatnerPrestia

(57) ABSTRACT

A GPS server capable of receiving information for use in determining ionospheric errors using mathematical formulas and sending ionospheric error correction information to GPS receivers that are in a location capable of receiving the ionospheric error correction information.

28 Claims, 9 Drawing Sheets

OTHER PUBLICATIONS

Komjathy, A. et al, "An Improved High Precicion Ionospheric Total Electron Content Modeling Using GPS," IEEE, 2000, pp. 28582860.*

Afraimovich, E.L. et al, "Updating the Ionospheric Delay Model Using GPS Data," 3rd International Symposium SIBSCONVERS'99, May 1999, pp. 385-387.*

* cited by examiner

IONOSPHERIC ERROR PREDICTION AND CORRECTION IN SATELLITE POSITIONING SYSTEMS

CROSS-REFERENCE TO RELATED APPLICATIONS

This application claims the benefit of U.S. Provisional Patent Application Ser. No. 60/357,157, titled "IONOSPHERIC ERROR PREDICTION AND CORRECTION IN SATELLITE POSITIONING SYSTEMS," filed on Feb. 13, 2002, which is incorporated herein by reference.

BACKGROUND OF THE INVENTION

1. Field of the Invention

This invention relates generally to satellite positioning systems ("SPS") devices, and in particular to ionospheric error predication and correction in an SPS.

2. Related Art

Satellite positioning systems ("SPS") are satellite-based navigation systems. Examples of SPS include but are not limited to the United States ("U.S.") Navy Navigation Satellite System ("NNSS") (also know as TRANSIT), LORAN, Shoran, Decca, TACAN, the Joint Program Office ("JPO") Global Positioning System ("GPS") (also known as NAVSTAR, which was developed by the U.S. Department of Defense ("DoD") in the early 1970s), the Russian counterpart known as Global Navigation Satellite System ("GLONASS") and any future Western European SPS such the proposed "Galileo" program. The NAVSTAR GPS (henceforth referred to simply as "GPS") was originally developed as a military system to fulfill the needs of the U.S. military; however, the U.S. Congress later directed DoD to also promote GPS's civilian uses. As a result, GPS is now a dual-use system that may be accessed by both U.S. government agencies (such as the military) and civilians. The GPS system is described in *GPS Theory and Practice*, Fifth ed., revised edition by Hofiann-Wellenhof, Lichtenegger and Collins, Springer-Verlag Wien NewYork, 2001, which is fully incorporated herein by reference.

Typically, the utilization of SPS includes identifying precise locations on the Earth and synchronizing telecommunication networks such as military communication networks and the code division multiple access ("CDMA") cellular telephone networks. Additionally, with the advent of the U.S. Congress' mandate, through the Federal Communications Commission ("FCC"), for a cellular telephone network that is capable of providing cellular telephone user's location within 50 feet in emergency situations (known as Enhanced 911 service or "E911"), SPS will be employed for both location determination and synchronization in many cellular applications.

In general, the array of GPS satellites transmit highly accurate, time coded information that permits a GPS receiver to calculate its location in terms of latitude and longitude on Earth as well as the altitude above sea level. GPS is designed to provide a base navigation system with accuracy within approximately 100 meters for non-military users and even greater precision for the military and other authorized users (with Selective Availability set to ON).

The space segment of GPS is a constellation of satellites orbiting above the earth that contain transmitters, which send highly accurate timing information to GPS receivers on earth. At present, the implemented GPS constellation includes 21 main operational satellites plus three active spare satellites. These satellites are arranged in six orbits, each orbit containing three or four satellites. The orbital planes form a 55° angle with the equator. The satellites orbit at a height of approximately 10,898 nautical miles (20,200 kilometers) above the Earth with orbital periods for each satellite of approximately 12 hours.

Generally, each of the orbiting satellites contains four highly accurate atomic clocks (two rubidium and two cesium). These atomic clocks provide precision timing pulses used to generate a unique binary code (also known as a pseudorandom "PRN-code" or pseudo noise "PN-code") that is transmitted to Earth. The PRN-code identifies the specific satellite in the constellation. The satellite also transmits a set of digitally coded ephemeris data (also known as "ephemerides") that defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the position of the satellite above the Earth at any given time. Typically, a ground control station updates the ephemeris data of the satellite once per day to ensure accuracy.

More specifically, each GPS satellite transmits a microwave radio signal presently composed of two carrier frequencies modulated by two digital codes and a navigation message. The two carrier frequencies are generated from a highly accurate fundamental L-band frequency of 10.23 MHz produced by the four atomic clocks. The two carrier frequencies, known as L1 and L2, are coherently derived from the fundamental frequency by multiplying the fundamental frequency by 154 and 120 to produce L1 at 1575.42 MHz and L2 at 1227.60 MHz, respectively. These dual frequencies are utilized to eliminate some of the major sources of error.

The pseudoranges that are derived from measured travel times of the signal from each satellite to the receiver use two PRN-codes that are modulated onto the two base carriers. The first code is the Coarse/Acquisition code ("C/A-code" also known as the "Standard Positioning Service") that is available for civilian use. The C/A-code has an effective wavelength of approximately 300 meters. Presently, the C/A-code is modulated only on L1 and is purposely omitted from L2. This omission allows DoD to control the information broadcast by the satellite and, thus, denies full system accuracy to non-authorized users. The second code is the Precision code ("P-code" also known as the "Precise Positioning Service") that has been reserved for the U.S. military and other authorized users and has an effective wavelength of approximately 30 meters. The P-code is modulated on both the L1 and L2 carriers.

In addition to the PRN-codes, a data message is modulated onto both carriers that include status information, satellite clock bias, and satellite ephemerides. It is appreciated by those skilled in the art that the U.S. intents to improve the above described signal structures in the future.

As an additional security precaution, DoD has included a number of techniques for denying non-authorized users full access to GPS. These techniques include Selective Availability ("SA"), Anti-spoofing ("A-S") and Selective Denial ("SD"). The goal of SA was to deny navigation accuracy to potential adversaries by dithering the satellite clock and manipulating the ephemerides. However, due to the appearance of new techniques to compensate for SA errors such as differential techniques, SA was eventually turned OFF on May 2, 2000. A-S has the ability to essentially turn-off the P-code or invoke an encrypted code as a means of denying access to the P-code to all but authorized users. A-S is accomplished by the modulo-2 sum of the P-code and an encrypted W-code. The resulting code is denoted as the Y-code and when A-S is active the P-code on the L1 and L2 carrier is replaced by the unknown Y-code. Future plans for signal structure will include a C/A-code on both the L1 and L2 carriers and the Y-code will be replaced with a new military split-spectrum signal denoted as the M-code. Finally, SD denies access to the GPS signal to unauthorized users in regions of interest by utilizing ground-based jammers.

FIG. 1 illustrates a diagram 100 of an example implementation of an SPS. In operation, a SPS receiver 102 located on the Earth 104 is designed to pick up signals 106, 108, 110 and 112 from several SPS satellites 114, 116, 118 and 120 simultaneously. The SPS receiver 102 decodes the information and, utilizing the time and ephemeris data, calculates the position of the SPS receiver 102 on the Earth 104. The SPS receiver 102 usually includes a floating-point processor (not shown) that performs the necessary calculations and may output a decimal display of latitude and longitude as well as altitude on a handset (not shown). Generally, signals 106, 108 and 110 from at least three satellites 114, 116 and 118 are needed for latitude and longitude information. A fourth satellite 120 signal 112 is needed to compute altitude.

Unfortunately, SPS includes several types of errors that typically degrade the performance of the SPS receiver. These errors include random errors and systematic errors that may originate at the satellites, the SPS receiver or be the result of signal propagation errors. The errors originating at the satellites include ephemeris, orbital, satellite clock, and in the case of GPS, the systematic error caused by the SA, S-A and/or SD selections. The errors originating at the receiver include; receiver clock errors, multipath error, receiver noise, and antenna phase center variations. Generally, multipath error correction methods are well known and have been implemented in some GPS chip set architectures.

The signal propagation errors are the result of atmospheric refraction that includes delays of the SPS signal as it passes through the ionospheric and tropospheric layers of the atmosphere. In general, the ionosphere is a dispersive medium, which lies between seventy and one thousand kilometers above the Earth's surface. The ionosphere is at the upper part of the atmosphere where the ultraviolet and X-ray radiation from the sun interacts with the gas molecules and atoms of the atmosphere to produce gas ionization. The gas ionization results in a large number of free negatively charged electrons and positively charged atoms and molecules. As a result, the electron density within the ionosphere is not constant and changes with altitude and time as a result of the sun's radiation and the Earth's magnetic field.

As such, the ionosphere bends SPS radio signals and changes their propagation speed as they passes through the ionosphere. Bending is known to typically cause negligible range errors (particularly if the satellite elevation angle is greater than 5 degrees); however, the change in propagation speed is known to cause significant range errors because the ionosphere speeds up the propagation of the carrier phase beyond the speed of light while slowing down the PRN-code by the same amount. The ionospheric delay is proportional to the number of free electrons along the SPS signal path and is known as the Total Electron Content ("TEC"). TEC depends on a number of factors including the time of day, the time of year, the 11-year solar cycle and geographic location of the SPS receiver relative to the SPS satellite. Additionally, the ionosphere causes a delay that is frequency dependent such that the lower the frequency, the greater the delay. Thus, the L2 delay is greater than the L1 delay. As an example, the ionospheric delay of a transmitted SPS signal may cause an error of approximately ten meters when calculating the position of the SPS receiver.

As a result, numerous techniques have been developed to minimize many of these errors including the technique known as Differential Global Position Systems ("DGPS"). DGPS is a technique of differencing signals from two or more SPS receivers to improve the accuracy of the signal. Typically, DGPS involves at least two SPS receivers. One SPS receiver is usually mobile (i.e., a "mobile GPS receiver") and another SPS receiver is stationary. The stationary SPS receiver is usually known as a "GPS server" and is typically located at a reference site that has known coordinates. If the GPS server and mobile GPS receiver are located within an acceptable proximity of each other, the GPS server and mobile GPS receiver will receive the GPS satellite signals simultaneously. Therefore, most of the errors in the GPS satellite signals will be received equally by both the GPS server and mobile GPS receiver. The GPS server then calculates any needed error corrections by comparing the difference between its calculated coordinates from the received GPS satellite signal and its known coordinates. These calculated error corrections are transmitted to the mobile GPS receiver, which may then compensate for the received errors in its received GPS satellite signal.

Unfortunately, DGPS is not always available and even when it is it may still take a relatively long time to determine an acceptable position accuracy at the mobile SPS receiver because the mobile SPS receiver needs to receive the differential data from the SPS server. However, this differential data is only the error information observed at the SPS server not the mobile SPS receiver. As the distance between the mobile SPS receiver and SPS server increases, the error information observed at the SPS server becomes less useful.

Additionally, now that SA has been turned off by DoD, ionospheric and multipath errors have become the most prominent errors. Therefore, the need for routinely communicating between the mobile SPS receiver and SPS server to compensate for SA is no longer present. Unfortunately, conventional DGPS schemes continue to perform numerous costly communications between the mobile SPS receiver and SPS server. Moreover, when the communication link is unstable (such as in a wireless system) or unavailable the benefits of DGPS drop of significantly.

Besides DGPS, another approach to correct for ionospheric errors includes using models of the ionosphere to predict the ionospheric errors. The model approach is most often utilized in non-DGPS standalone GPS applications. The Klobuchar model (also known as the TEC model) is probably the most commonly utilized ionospheric model because the model is broadcast in GPS navigation messages from the GPS satellite and is described in the *Global Positioning System, Interface Control Document*, ICD-GPS-200, Revision C, Initial Release, Oct. 10, 1993, which is fully incorporated herein by reference. According to ICD-GPS-200, for the L1 frequency, the ionospheric error may be modeled as a shell (also known as a "half-cosine" curve) that is described by the following physical relationship $$T_{iono} = \begin{cases} F \times \left[DC + A\cos\left(\frac{2\pi(t-\psi)}{P}\right)\right], & \text{if } |x| < \frac{\pi}{2} \\ F \times (DC), & \text{if } |x| \geq \frac{\pi}{2} \end{cases} \text{ where } x = 2\pi(t-\psi)/P \text{ and } T_{iono}$$

(also known as $T_{zenith}$) has the units of seconds and is the error on the zenith direction caused by the ionosphere. FIG. 2 illustrates an example graph 200 of $T_{zenith}$ 202 in nanoseconds versus local time 204 in hours. F is a scaling factor of the ionospheric delay that is typically known as the "obliquity factor," which is defined as $F=1.0+16.00\times(0.53-E)^3$, where E is the "elevation angle" between a GPS receiver and a GPS satellite. FIG. 3 illustrates an example graph 300 of F 302 versus elevation angle 304 in degrees.

The second part of the $T_{iono}$ formula represents the error effect caused by the change to the TEC. Here $$A = \begin{cases} \sum_{n=0}^{3} \alpha_n \phi_m^n, & \text{if } A \leq 0 \\ 0, & \text{if } A < 0 \end{cases}$$

seconds and $$P = \begin{cases} \sum_{n=0}^{3} \beta_n \phi_m^n, & \text{if } P \geq 72,000 \\ 72,000, & \text{if } P < 72,000 \end{cases}$$

seconds where $DC=5.0 \times 10^{-9}$ seconds, $\sigma=50,400$ seconds and $\alpha_n$ and $\beta_n$ are the satellite transmitted data words with n=0, 1, 2 and 3, which are defined by reference paragraph 20.3.3.5.1.9 ("Ionospheric Data") described in the ICD-GPS-200. Reference paragraph 20.3.3.5.1.9 defines parameters that allow the L1 only, or L2 only, user to utilize the ionospheric model (reference paragraph 20.3.3.5.2.5) for computation of the ionospheric delay and are contained in page 18 of subframe 4. The bit lengths, scale factors, ranges and units of these parameters are given in Table 20-X of the ICD-GPS-200.

Unfortunately, the TEC model described in ICD-GPS-200 still results in significant ionospheric errors because ICD-GPS-200 treats both DC and σ as constant values while the actual TEC values of the ionosphere is difficult to model. According to ICD-GPS-200 model, DC has a constant value of 5 nanoseconds though it is known to vary from location to location and the phase term σ has a constant value of 14 hours (i.e., 50,400 seconds) although it is also known to vary from 11 to 17 hours for a certain season, location and condition of solar activity. As a result, the ICD-GPS-200 model is known to correct for no more than about 50% of the ionospheric transmission delays.

Thus, there is a need in the art for a way to predict and compensate for the ionospheric errors in SPS.

SUMMARY

This invention provides a way for satellite positioning systems ("SPS") to more accurately determine a SPS receiver's position with less frequent message transmission compared to conventional way of SPS receivers. A SPS system having a GPS receiver and a GPS server compensates for ionospheric errors by receiving ionospheric information at periodic times coinciding with ionospheric events such as sunrise, noon and sun set. The compensation information is sent to a GPS receiver at predetermined events, such as power up, sunrise, noon, and sun set. The GPS receiver then may use other error correction methods in addition to ionospheric error correction when determining the position of the GPS receiver.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
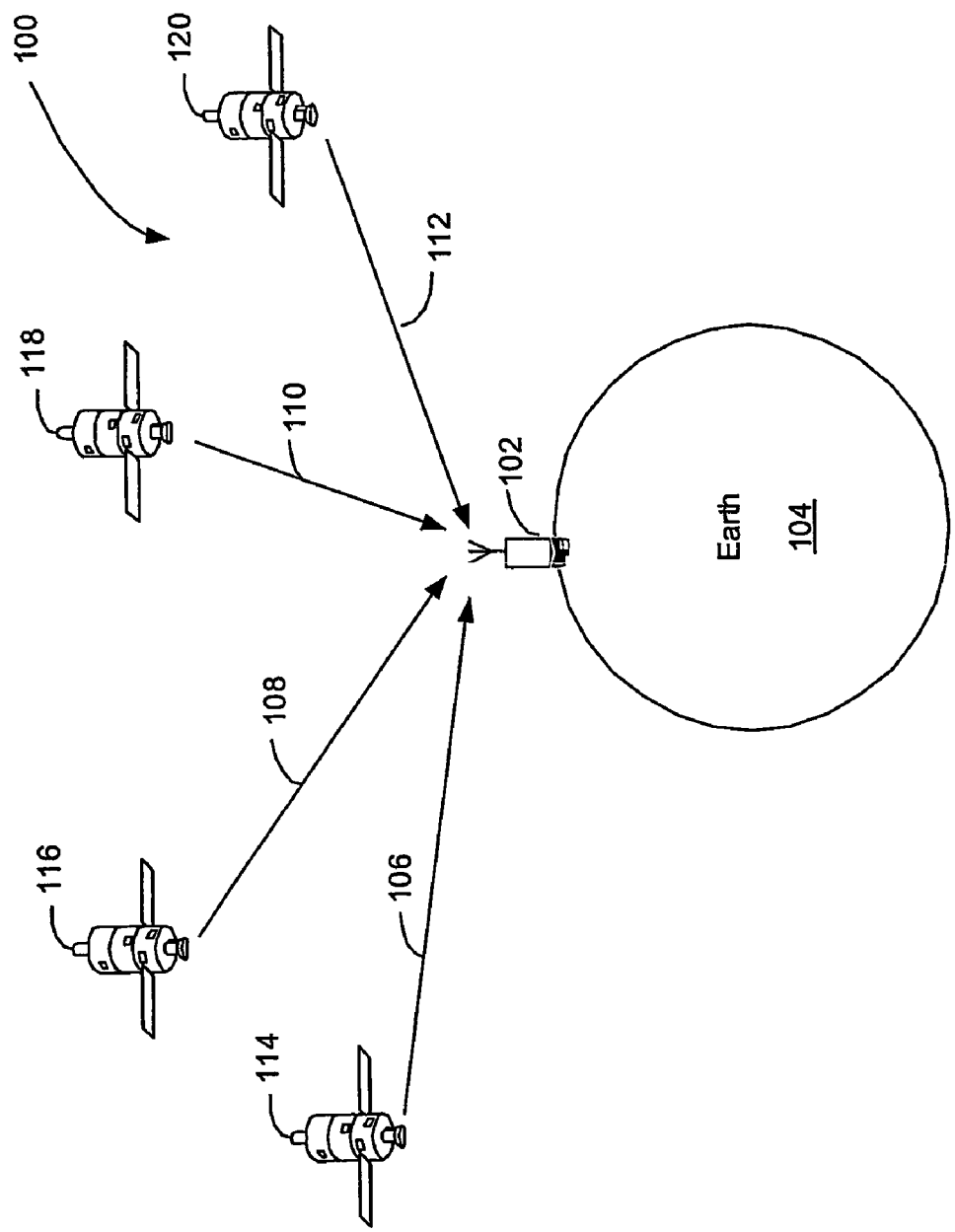
FIG. 1 illustrates a block diagram of an example implementation of a satellite positioning system ("SPS").
Figure 2:
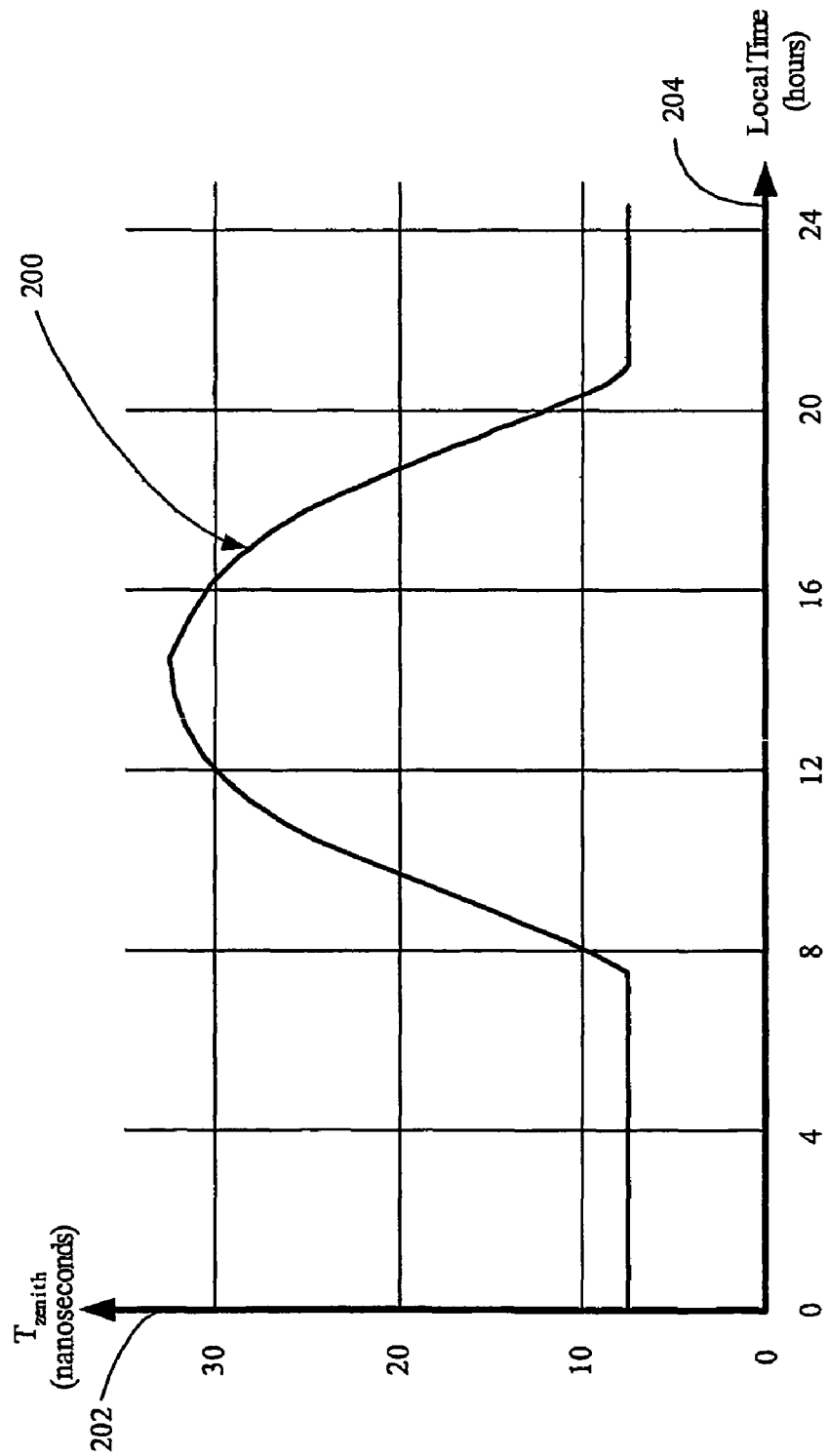
FIG. 2 illustrates an example graph of $T_{zenith}$ in nanoseconds versus local time in hours.
Figure 3:
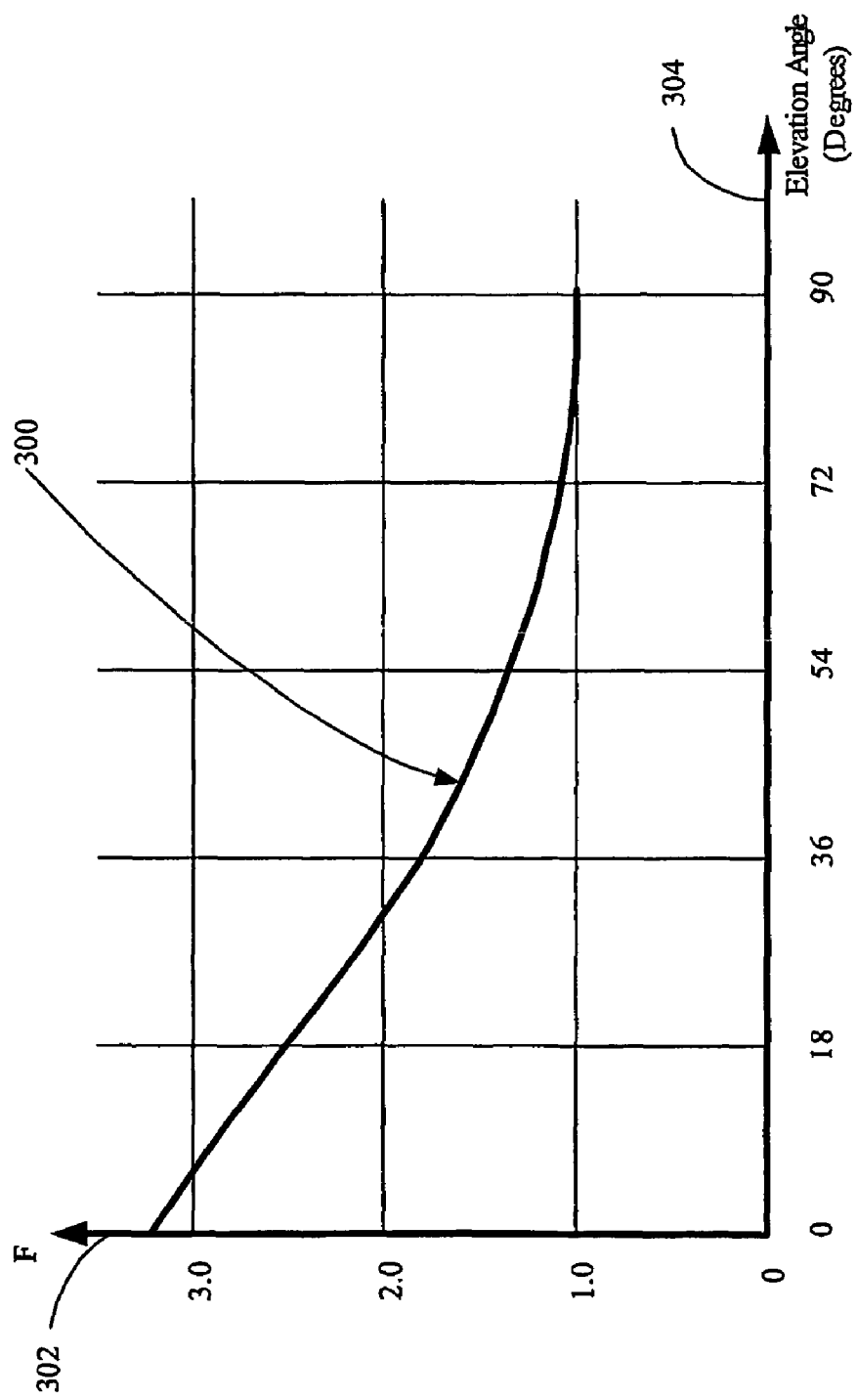
FIG. 3 illustrates an example graph of F versus elevation angle in degrees.
Figure 4:
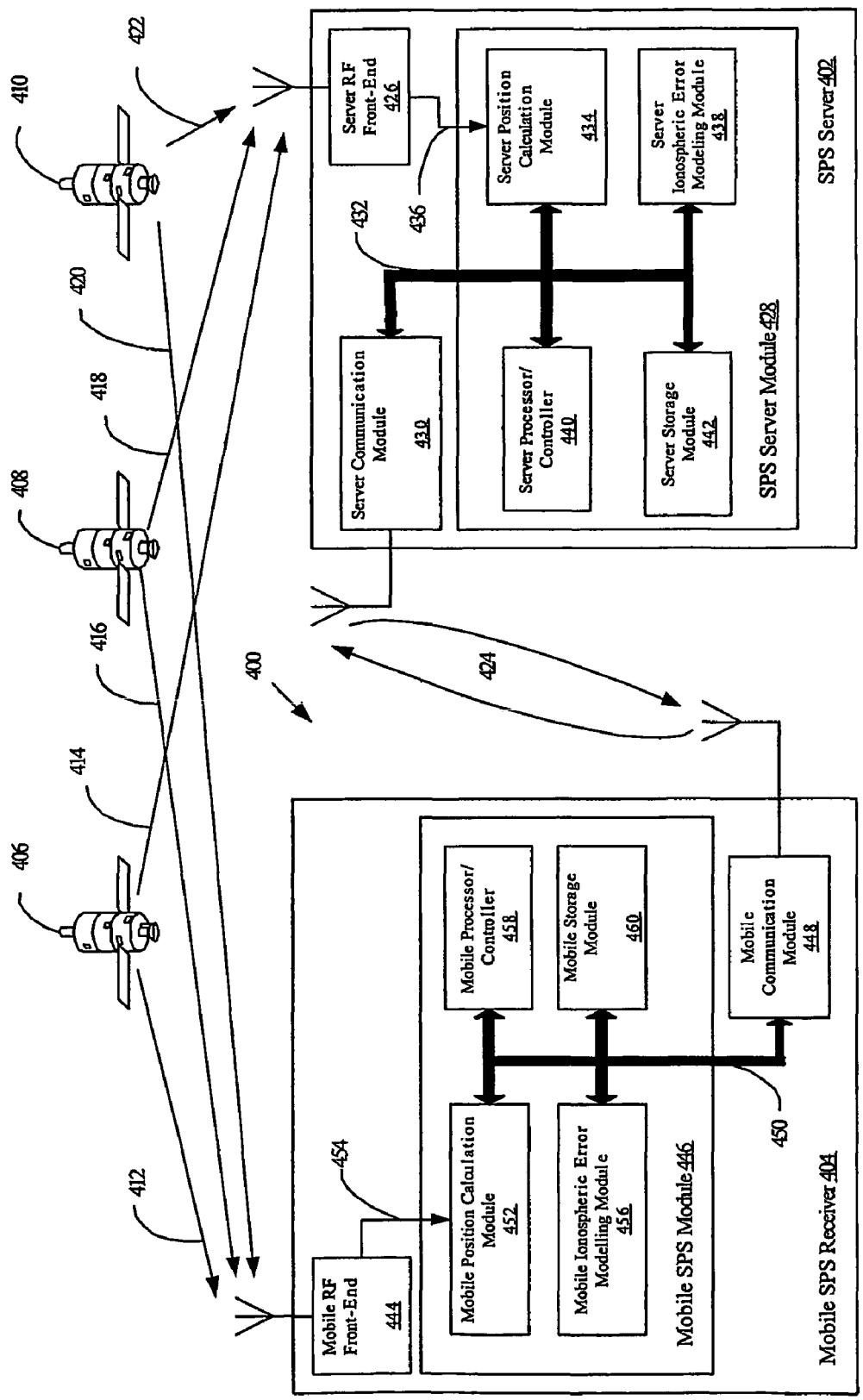
FIG. 4 is block diagram of an example implementation of a SPS for predicting and compensating for ionospheric errors ("SPSPC").

In FIG. 4, a satellite positioning system ("SPS") for predicting and compensating for ionospheric errors ("SPSPC") 400 is shown having a SPS server 402 and a mobile SPS receiver 404. Both the SPS server 402 and mobile SPS receiver 404 are in signal communication with various SPS satellites 406, 408 and 410 via signal paths 412, 414, 416, 418, 420 and 422, respectively. Additionally, the SPS server 402 is in signal communication with the mobile SPS receiver 404 via signal path 424.

The SPS server 402 may include a server radio frequency ("RF") front-end. 426, a SPS Server Module 428, a Server Communication module 430 and a SPS server bus 432. The SPS Server Module 428 may include a Server Position Calculation Module 434 in signal communication with the RF front-end 426, via signal path 436, a Server Ionospheric Error Modeling Module 438, Server Processor and/or Controller 440 and Server Storage Module 442. The Server Ionospheric Error Modeling Module 438, Server Processor and/or Controller 440 and Server Storage Module 442 and Server Communication Module 430 are all in signal communication via the SPS server bus 432.

Similarly, the mobile SPS receiver 404 may include a Mobile RF front-end 444, a Mobile SPS Receiver Module 446, a Mobile communication module 448 and a Mobile SPS receiver bus 450. The Mobile SPS Receiver Module 446 may include a Mobile Position Calculation Module 452 in signal communication with the Mobile RF front-end 444, via signal path 454, a Mobile Ionospheric Error Modeling Module 456, Mobile Processor and/or Controller 458 and Mobile Storage Module 460. The Mobile Ionospheric Error Modeling Module 456, Mobile Processor and/or Controller 458 and Mobile Storage Module 460 and Mobile Communication Module 448 are all in signal communication via the Mobile SPS bus 450.

Examples of the Server RF Front-End 426 and Mobile RF Front-End may include the following GPS and radio chipsets: Conexant 6732, third generation Gemini/Pisces solutions, owned by SiRF Technology, Inc., San Jose, Calif., GPS architectures utilizing Colossus RF ASIC by Trimble, PVT-6 receiver and RF chip MRFIC 1504, by Motorola; Inc. Schaumburg, Ill., BT1575A GPS receiver by BethelTronix Inc, Cerritos, Calif., PCS and GPS receiver RFR3300 and IRF 3300 by Qualconun, Inc., San Diego, Calif., UPB1005GS by NEC, Corp., Japan, and CXA1951AQ by Sony, Inc., Japan.

Examples of the Server Communication Module 430 and Mobile Communication Module 448 may be any radio and/or cellular communication device that is capable of transmitting and receiving analog and/or digital communication data. Examples of the SPS Server Module 428 and Mobile SPS Module 446 may include any baseband SPS circuitry that is capable of modeling ionospheric errors.

The Server Processor/Controller 440 and Mobile Processor/Controller 458 may include any microcontroller or microcomputer capable of controlling the operations of the sub-modules of either the SPS Server Module 428 or Mobile SPS Receiver 404, processing the data produced by the Server Position Calculation Module 434 or Mobile Position Calculation Module 452 and generating the ionospheric error data to create and utilize an ionospheric error model. The Server Storage Module 442 and Mobile Storage Module 460 may include any type of storage device and/or memory capable of storing data values or software logic and code.

The Server Processor/Controller 440 and/or Mobile Processor/Controller 458 may be any type of control device that may be selectively implemented in software, hardware (such as a computer, processor, microcontroller or the equivalent), or a combination of hardware and software. The Server Processor/Controller 440 and/or Mobile Processor/Controller 458 may utilize optional software (not shown) residing in software memory (not shown) in Server Storage Module 442 and/or Mobile Storage Module 460.

Any software in Server Storage Module 442 and/or Mobile Storage Module 460 may include an ordered listing of executable instructions for implementing logical functions, may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
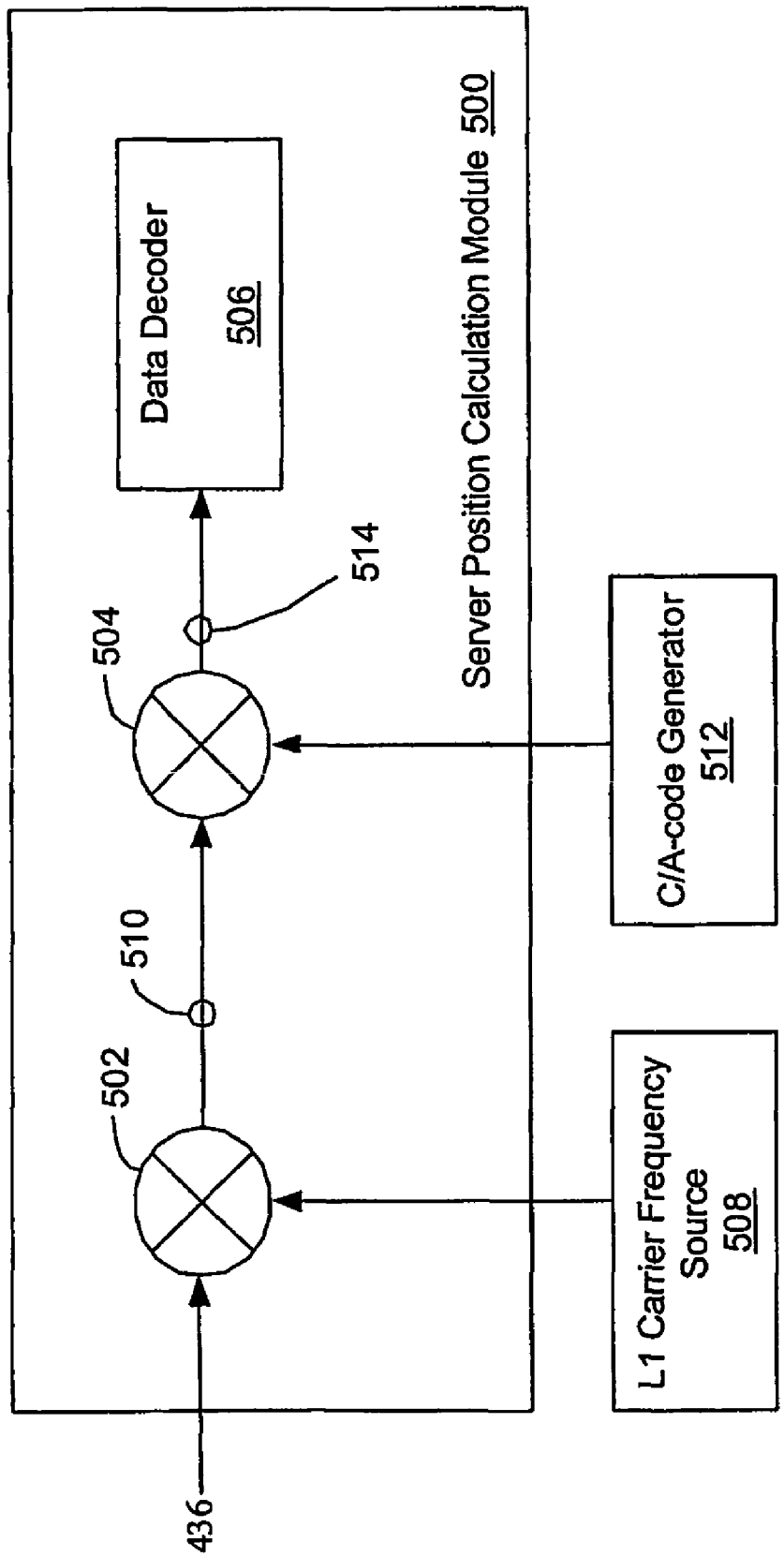
FIG. 5 is a block diagram of an example implementation of the Server Position Calculation Module shown in FIG. 4.
Figure 6:
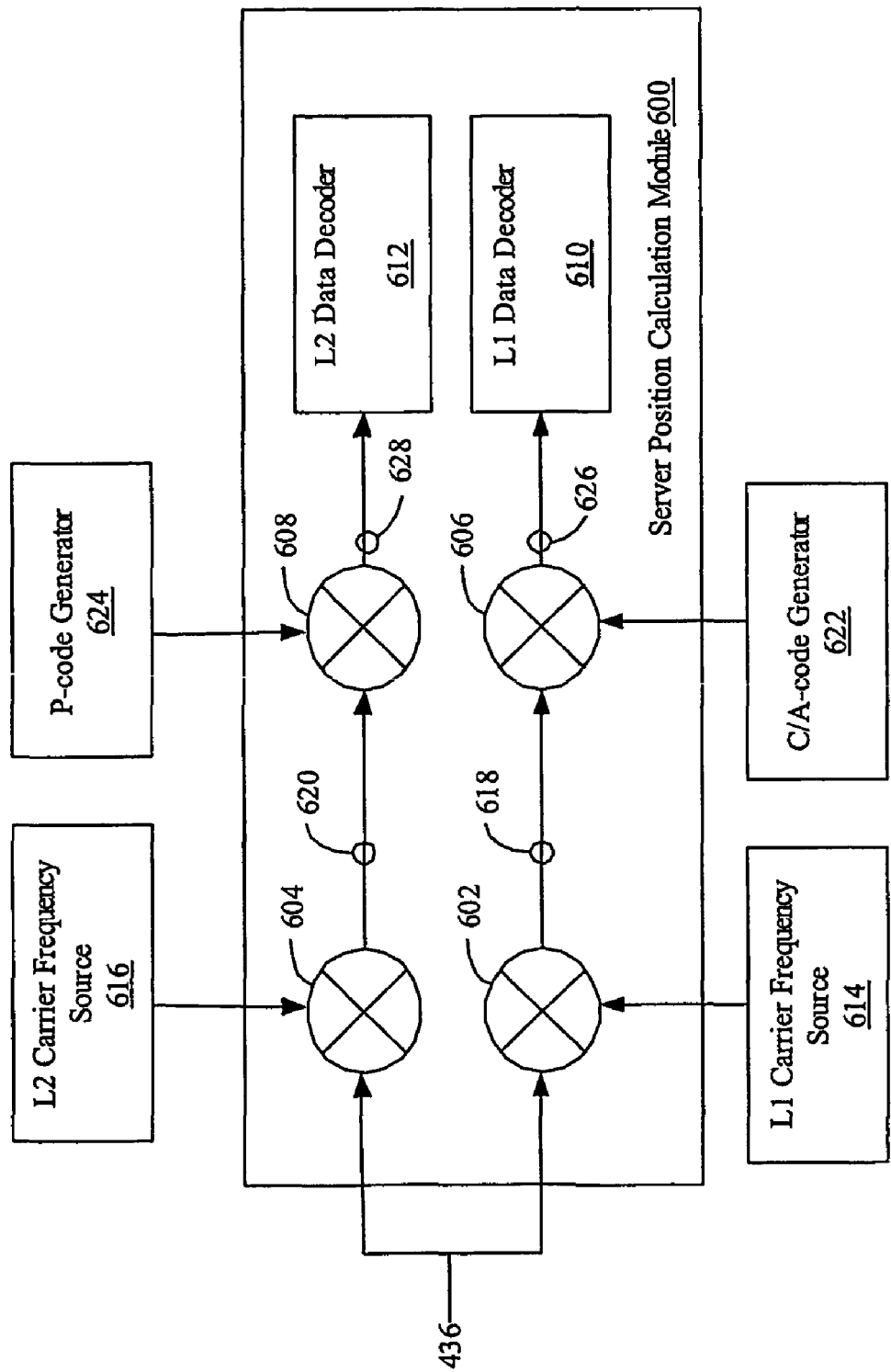
FIG. 6 is a block diagram of another example implementation of the Server Position Calculation Module shown in FIG. 4.
Figure 7:
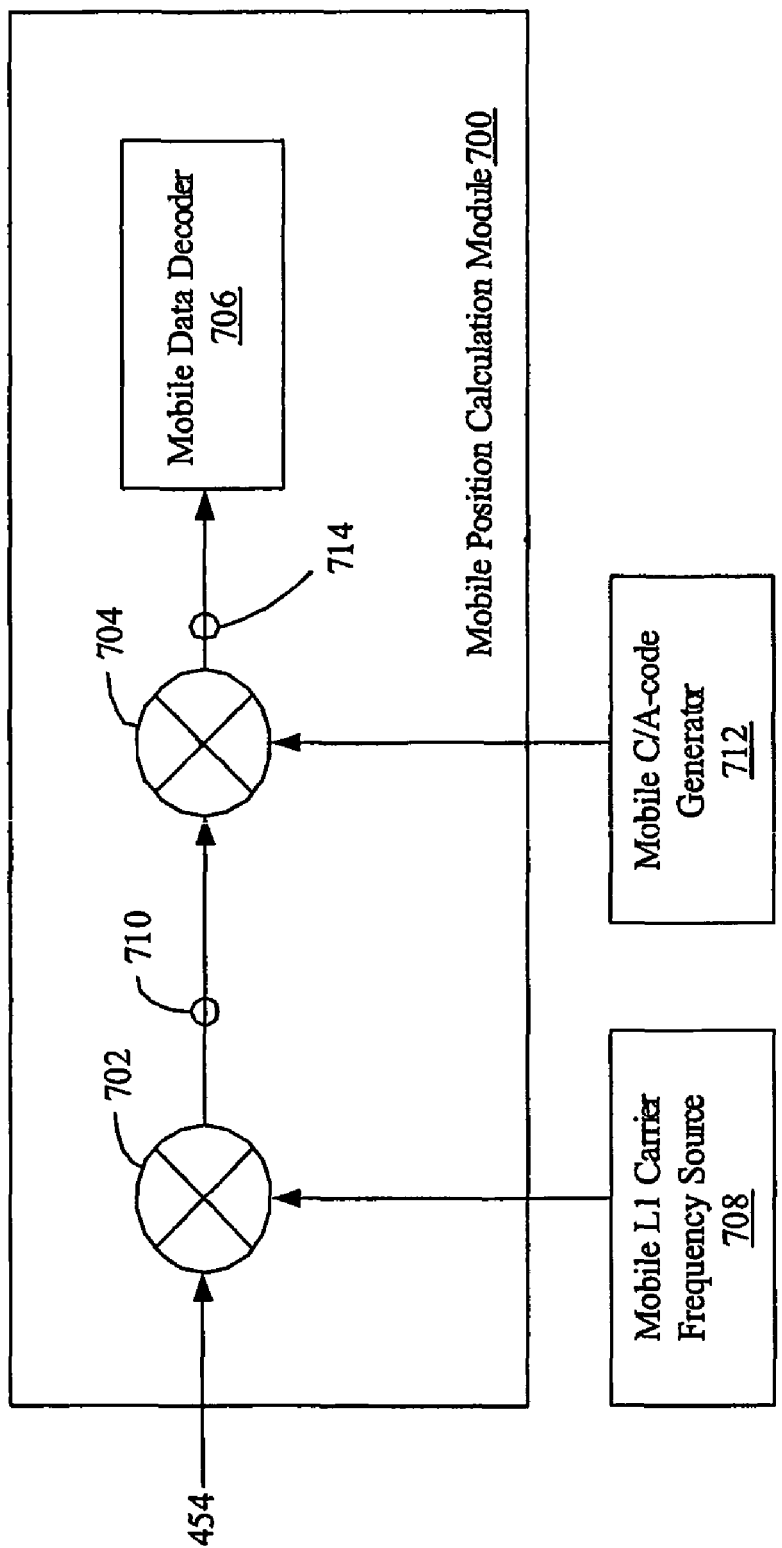
FIG. 7 is a block diagram of an example implementation of the Mobile Position Calculation Module shown in FIG. 4.

The Server Position Calculation Module 434 and the Mobile Position Calculation Module 452 may be implemented to operate on either or both the carrier frequencies L1 and L2. FIGS. 5-7 describe example implementations of the Server Position Calculation Module 434 and the Mobile Position Calculation Module 452 operating on various carrier frequencies.

In FIG. 5, an example implementation of the Server Position Calculation Module 500 that only operates on carrier frequency L1 is shown. The Server Position Calculation Module 500 may include a carrier frequency mixer 502, C/A-code mixer 504 and a Data Decoder 506. As an example of operation, the Server RF Front-End 426, FIG. 4, provides a received GPS signal, via signal path 436, to the Server Position Calculation Module 500, FIG. 5. The Server Position Calculation Module 500 first removes the L1 carrier from the received GPS signal 436 by mixing, in the carrier frequency mixer 502, the received GPS signal 436 with a signal produced by a L1 carrier frequency source 508. The resultant demodulated signal 510 is then input into the C/A-code mixer 504 where the demodulated signal 510 is mixed with a signal produced by a C/A-code generator 512. The output 514 of the C/A-code mixer 504 is then input to the data decoder 506 where the signal is decoded and later processed. The C/A-code mixer 504 may be implemented with a bank of correlators or a matched filter network.

In FIG. 6, another example implementation of the Server Position Calculation Module 600 is shown that operates on both the L1 and L2 carrier frequencies. The Server Position Calculation Module 600 may include a L1 carrier frequency mixer 602, a L2 carrier frequency mixer 604, a C/A-code mixer 606, a P-code mixer 608, and a L1 Data Decoder 610 and a L2 Data Decoder 612. As an example of operation, the Server RF Front-End 426, FIG. 4, provides a received GPS signal, via signal path 436, to the Server Position Calculation Module 600, FIG. 6. The Server Position Calculation Module 600 first removes the L1 carrier from the received GPS signal 436 by mixing, in the L1 carrier frequency mixer 602, the received GPS signal 436 with a signal produced by a L1 carrier frequency source 614. The Server Position Calculation Module 600 also simultaneously removes the L2 carrier from the received GPS signal 436 by mixing, in the L2 carrier frequency mixer 604, the received GPS signal 436 with a signal produced by a L2 carrier frequency source 616. The resultant demodulated signals 618 and 620 are then input into the C/A-code mixer 606 and P-code mixer 608, respectively, where the demodulated signal 618 is mixed with a signal produced by a C/A-code generator 622 and the demodulated signal 620 is mixed with a signal produced by a P-code generator 624. The output 626 of the C/A-code mixer 606 is then input to the L1 data decoder 610 and the output 628 of the P-code mixer 608 is then input to the L2 data decoder 612, where the signals are decoded and later processed. Both the C/A-code mixer 606 and P-code mixer 628 may be implemented with a bank of correlators or a matched filter network.

It is appreciated by those skilled in the art that the advantage to utilizing both L1 and L2 carrier frequencies is that multiple frequency observations from the same GPS satellite may almost completely correct any delay errors caused by ionospheric interference. However, it is also appreciated that for security reasons most GPS receivers do not receive the L2 carrier frequency because they are not authorized by DoD.

Similarly, in FIG. 7, an example implementation of the Mobile Position Calculation Module 700 that only operates on carrier frequency L1 is shown. The Mobile Position Calculation Module 700 may include a carrier frequency mixer 702, C/A-code mixer 704 and a Mobile Data Decoder 706. As an example of operation, the Mobile RF Front-End 444, FIG. 4, provides a received GPS signal, via signal path 454, to the Mobile Position Calculation Module 700, FIG. 7. The Mobile Position Calculation Module 700 first removes the L1 carrier from the received GPS signal 454 by mixing, in the carrier frequency mixer 702, the received GPS signal 454 with a signal produced by a Mobile L1 carrier frequency source 708. The resultant demodulated signal 710 is then input into the C/A-code mixer 704 where the demodulated signal 710 is mixed with a signal produced by a Mobile C/A-code generator 712. The output 714 of the C/A-code mixer 704 is then input to the Mobile Data Decoder 706 where the signal is decoded and later processed. Again, the Mobile C/A-code mixer 704 may be implemented with a bank of correlators or a matched filter network.

While FIG. 7 only illustrates an example implementation of the Mobile Position Calculation Module 700 operated on carrier frequency L1, the Mobile Position Calculation Module 700 may also be designed to operate on both the L1 and L2 carrier frequencies. One skilled in the art will recognize that design modifications, similar those illustrated in FIG. 6, may also be implemented for the Mobile Position Calculation Module 700 to operate on both the L1 and L2 carrier frequencies.

Figure 8:
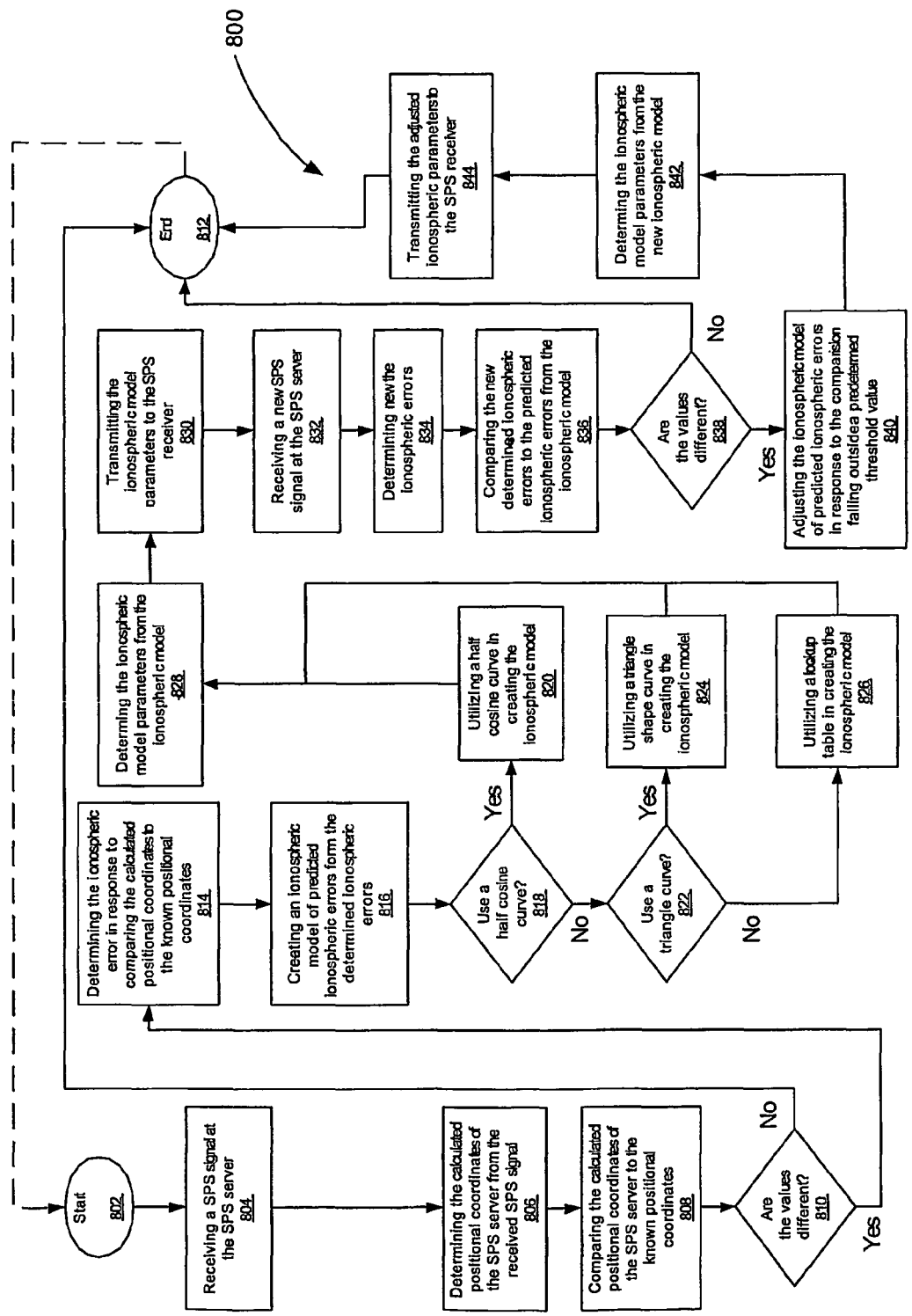
FIG. 8 is a flowchart diagram illustrating an example process preformed by the SPS Server shown in FIG. 4 in determining the ionospheric error correction.

In FIG. 8, a flowchart 800 is shown that describes an example process performed by the SPS Server 402, FIG. 4, to determine the ionospheric error correction and create an ionoshpheric error model for predicting further ionospheric errors. The process starts in step 802 when the SPS server 402 receives a SPS signal in step 804. The SPS Positional Calculation module 434 then, in step 806, determines the calculated positional coordinates of the SPS server 402 from the received SPS signal. Because the SPS server 402 is utilized as a reference source, the actual positional coordinates of the SPS server 402 are known and the SPS Positional Calculation module 434 is able to detect and identify positional range errors caused by the ionosphere. Therefore, in step 808, the SPS Positional Calculation module 434 compares the calculated positional coordinates of the SPS server 402 obtained from the SPS signal to the actual known positional coordinates of the SPS server 402. If the values are the same, the ionosphere has not added any error in the measurement and the process ends at step 812 because no correction is necessary.

If instead, the values are different, the process continues to step 814 where the SPS Positional Calculation module 434 determines the ionospheric error by comparing the calculated positional coordinates from SPS signal to the known positional coordinates of the SPS server 402. In step 816, the Server Ionospheric Error Modeling Module 438 then creates an ionospheric model of predicted ionospheric errors from the ionospheric error determined by the SPS Positional Calculation module 434. In steps 818, 820, 822, 824 and 826, the Server Ionospheric Error Modeling Module 438, in combination with the Server Processor/Controller 440, determines the best approach for creating the ionospheric model. Various methods may be made available to the Server Ionospheric Error Modeling Module 438 for creating the ionospheric model. The various modeling methods may be used alone, or in combination, based upon any number of factors, such as calculation speed, degree of error, or other determining factors. Steps 818 and 820, illustrate the availability of a half cosine curve to create the ionospheric model, while steps 822 and 824, illustrate the availability of a triangle shape curve to create the ionospheric model. The half cosine curve, discussed above, is well known to those skilled in the art. The triangle shape curve is a simplified version of the cosine curve and may be utilized in certain conditions when ionospheric errors vary only slightly. An example triangle curve relationship may be described by the following equation:

$$T_{iono} = \begin{cases} F \times [DC + A \times |x|], & \text{if } |x| < \frac{\pi}{2} \\ F \times (DC), & \text{if } |x| \geq \frac{\pi}{2}. \end{cases}$$

Additionally, step 826 illustrates the utilization of a lookup table to create the ionospheric model. Look up tables are well known in the art and may include a tabulation of data that was previously created by mathematical relationship, such as a half cosine or triangle curve, in order to simulate or model the process. As an example, the lookup table may be stored in the Server Storage Module 442 allowing the Server Processor/Controller 440 to access the table as needed. In step 828, once the Server Ionospheric Error Modeling Module 438 has finished creating the ionospheric model, the Server Ionospheric Error Modeling Module 438 determines the descriptive parameters for the ionospheric model, which are passed to the Server Communication Module 430 via the SPS Server bus 432. In step 830, the Server Communication Module 430 transmits the ionospheric model parameters to the Mobile SPS receiver 404.

As shown by step 832, the accuracy of the generated ionospheric error model may be verified and corrected as necessary. In step 832, the SPS Server 402 receives a new or second SPS signal. In step 834, the Server Position Calculation Module 434 and Server Ionospheric Error Modeling Module 434 determine the new or second ionospheric error by comparing calculated position of the SPS server 402 measured by the SPS signal from the actual position of the SPS server 402. The new or second ionospheric error is then compared against the predicted ionospheric error from the ionospheric model generated by the Server Ionospheric Error Modeling Module 434 in step 836. If second or new ionospheric error falls within the acceptable parameters of the ionospheric model, the process again ends in step 838 because no corrections are need to the ionospheric model. If instead, an error is detected, the process continues to step 840, where the ionospheric model of predicted ionospheric errors is adjusted in response to the second ionospheric error falling outside the parameters established by the ionospheric model. New ionospheric model parameters from the newly generated ionospheric model may then be determined by the Server Ionospheric Error Modeling Module 438 in step 842. The adjusted ionospheric parameters are then transmitted by the Server Communication Module 430, via signal path 424, to the Mobile SPS Receiver 404 in step 844. The process then ends in step 812. However, it is appreciated that the whole process may repeat itself numerous times as needed to properly model errors in SPS signal from the ionosphere.

Figure 9:
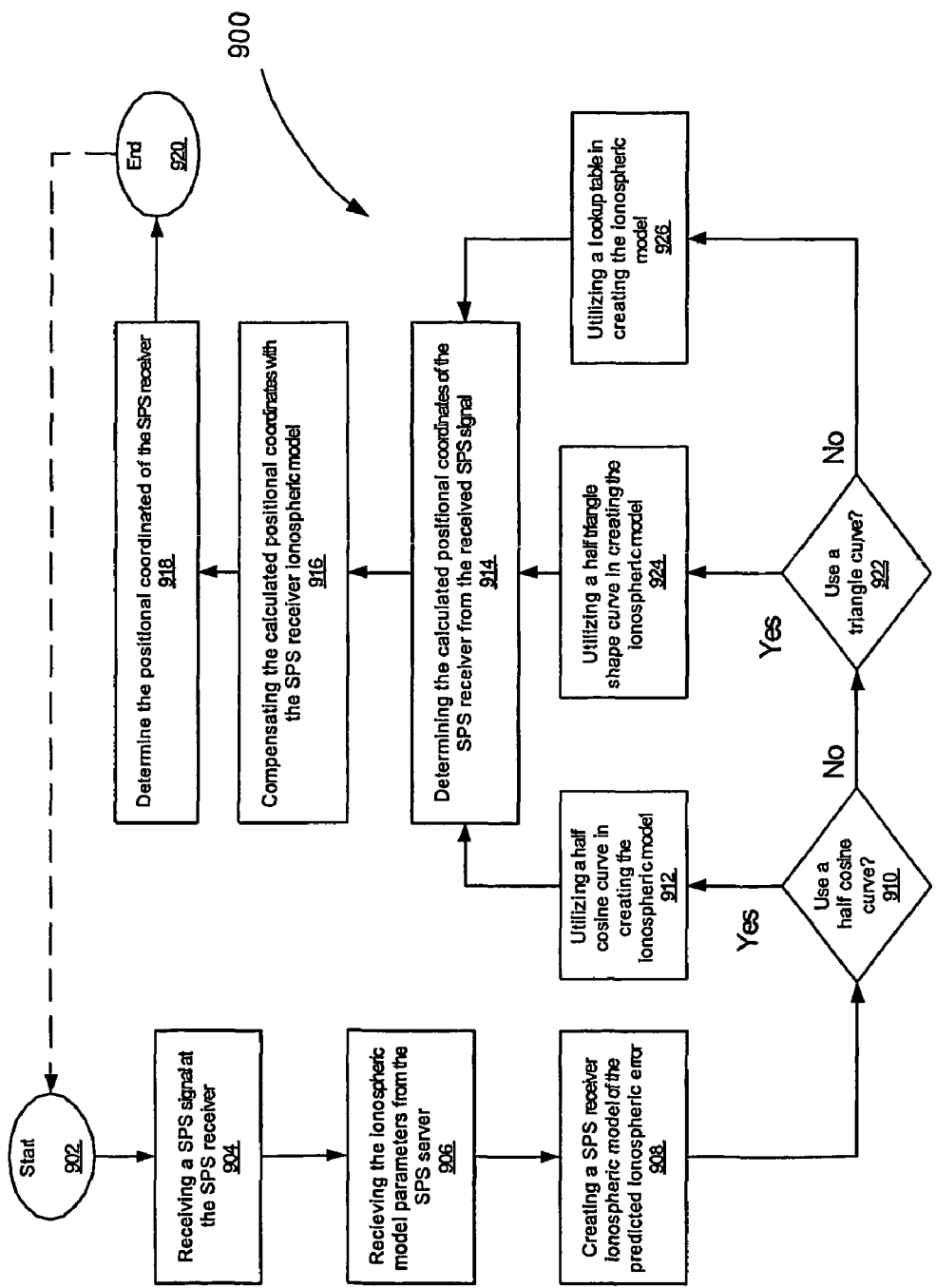
FIG. 9 is a flowchart diagram illustrating an example process preformed by the mobile SPS receiver shown in FIG. 4 in compensating for ionospheric error.

In FIG. 9, a flowchart 900 is shown that describes an example process preformed by the mobile SPS receiver 404, FIG. 4, in compensating for ionospheric error. The process starts at step 902, where the Mobile SPS receiver 404 receives a SPS signal from an SPS satellite in step 904. The Mobile Communication Module 448 also receives the ionospheric model parameters from the SPS Server 402 in step 906. The Mobile Position Calculation Module 452 and Mobile Ionosphere Error Modeling Module 456 create a SPS receiver ionospheric model of the predicted error from the received ionospheric model parameters in step 908. Similar to the options in the SPS Server 402, the Mobile SPS Module 446 may utilize a half cosine curve in steps 910 and 912, a triangle curve in steps 922 and 924 or lookup table in step 926. The lookup table may similarly be stored in the mobile storage module 460. The Mobile Position Calculation Module 452 then determines the calculated positional coordinates of the SPS receiver 404 from the received SPS signal in step 914. The Mobile SPS Module 446 then, in step 918, compensates for the ionospheric errors in the calculated positional coordinates with the SPS receiver ionospheric model created by the Mobile Ionospher Error Modeling Module 456. The process then ends in step 920. However, it is appreciated by those skilled in the art that the Mobile SPS Module 446 may repeat the process if the SPS Server 402 sends a new transmission with new ionospheric model parameters or if it is needed by the Mobile SPS Module 446.

While various embodiments of the invention have been described, it will be apparent to those of ordinary skill in the art that malty more embodiments and implementations are possible that are within the scope of this invention.

What is claimed is:

1. A method for correcting ionospheric errors in a satellite positioning system ("SPS") having a SPS server with known positional coordinates and a mobile SPS receiver, the method comprising:
   receiving SPS signals from SPS satellites at the SPS server;
   calculating a position of the SPS server using the SPS signals from the SPS satellites;
   comparing calculated positional coordinates of the calculated position of the SPS server with the known positional coordinates;
   determining ionospheric errors in response to comparing the calculated positional coordinates of the calculated position of the SPS server with the known positional coordinates;
   creating an ionospheric model of predicted ionospheric errors from the determined ionospheric errors, the ionospheric model having ionospheric model parameters; and
   transmitting the ionospheric model parameters to the mobile SPS receiver, where the mobile SPS receiver uses the ionospheric model parameters to create an SPS receiver ionospheric model.

2. The method of claim 1, wherein creating an ionospheric model includes utilizing a half cosine curve.

3. The method of claim 1, wherein creating an ionospheric model includes utilizing a triangle shape curve.

4. The method of claim 1, wherein creating an ionospheric model includes utilizing a lookup table.

5. The method of claim 1, further including:
   receiving new SPS signals at the SPS server;
   determining new ionospheric errors in response to receiving the new SPS signals;
   comparing the new determined ionospheric errors to the predicted ionospheric error from the ionospheric model;
   adjusting the ionospheric model of predicted ionospheric errors in response to the comparison outside a predetermined threshold value, the adjusted ionospheric model having adjusted the ionospheric model parameters; and
   transmitting the adjusted ionospheric model parameters to the mobile SPS receiver.

6. The method of claim 5, wherein the predetermined threshold value corresponds to the changing points of the ionospheric model.

7. The method of claim 6, wherein creating an ionospheric model includes utilizing a half cosine curve.

8. The method of claim 6, wherein creating an ionospheric model includes utilizing a triangle shape curve.

9. The method of claim 6, wherein creating an ionospheric model includes utilizing a lookup table.

10. The method of claim 5, further including:
    receiving the new SPS signals at the mobile SPS receiver;
    receiving the transmitted ionospheric model parameters from the SPS server;
    creating, at the SPS receiver, a mobile SPS receiver ionospheric model of predicted ionospheric errors from the received ionospheric model parameters;
    determining the calculated positional coordinates with the mobile SPS receiver ionospheric model.

11. The method of claim 10, wherein creating an ionospheric model includes utilizing a half cosine curve.

12. The method of claim 10, wherein creating an ionospheric model includes utilizing a triangle shape curve.

13. The method of claim 10, wherein creating an ionospheric model includes utilizing a lookup table.

14. A satellite positioning system ("SPS") comprising:
    a SPS server configured to detect ionospheric errors in received SPS signals from SPS satellites, to create an ionospheric error model of predicted ionospheric errors, to determine ionospheric model parameters from the ionospheric error model, and to transmit the ionospheric model parameters via a communication link;
    a mobile SPS receiver in signal communication with the SPS server via the communication link, the mobile SPS receiver configured to receive both the received SPS signals from the SPS satellites and the ionospheric model parameters transmitted from the SPS server and, in response to receiving both the received SPS signals and ionospheric model parameters the mobile SPS receiver is capable of creating the ionospheric error model using the ionospheric model parameters to compensate for the ionospheric errors in the received SPS signals.

15. The SPS of claim 14, wherein the SPS server further includes:
    a server position calculation module in the SPS server;
    a server ionospheric error modeling module in signal communication with the SPS receiver; and
    a server processor in signal communication with the server position calculation module, server ionospheric error modeling module and server communication module, the processor capable of creating the ionospheric error model.

16. The SPS of claim 14, further including a server storage module in signal communication with the server position calculation module, server ionospheric error modeling module, server processor and server communication module.

17. The SPS of claim 16, wherein the SPS server is capable of receiving and processing both L1 and L2 carrier frequencies.

18. The SPS of claim 14, wherein the mobile SPS receiver further includes:
    a mobile position calculation module in the mobile SPS receiver;
    a mobile ionospheric error modeling module in signal communication with the mobile position calculation module; and a mobile processor in signal communication with both the server position calculation module and server ionospheric error modeling module, the processor capable of compensating for ionospheric errors in the received SPS signals utilizing ionospheric model parameters.

19. The SPS of claim 18, further including a mobile storage module in signal communication with the mobile position calculation module, mobile ionospheric error modeling module, mobile processor and mobile communication module.

20. A satellite positioning system ("SPS") comprising:
means for detecting ionospheric errors in received SPS signals transmitted from SPS satellites at a SPS server;
means for creating an ionospheric error model of predicted ionospheric errors and determining ionospheric error model parameters from the ionospheric error model in response to detecting the ionospheric errors with the detecting means; and
a mobile SPS receiver in signal communication with the detecting means and creating means via a communication link, the mobile SPS receiver capable of receiving both the received SPS signals and the ionospheric model parameters, the mobile SPS receiver is capable of creating the ionospheric error model using the ionospheric model parameters to compensate for ionospheric errors in the receiver SPS signals.

21. The SPS of claim 20, wherein the SPS server further includes:
means for calculating the position of the SPS server from the received SPS signals;
means for modeling the ionospheric error from the received SPS signals;
means for communicating to the mobile SPS receiver; and
means for controlling the calculating means, modeling means and communication means.

22. The SPS claim of 20, wherein the mobile SPS receiver further includes:
means for calculating the position of the mobile SPS receiver;
means for communicating to the SPS server; and
means for modeling the ionospheric error from the received SPS signals at the SPS server.

23. A computer-readable storage medium having instructions encoded thereon executable by a computer, the instructions when executed on a computer perform the steps of:

correcting ionospheric errors in an satellite positioning system ("SPS") having a SPS server with known positional coordinates and a SPS receiver,
receiving SPS signals at the SPS server;
creating an ionospheric model of predicted ionospheric errors from the determined ionospheric errors, the ionospheric model having ionospheric model parameters; and
transmitting the ionospheric model parameters to the SPS receiver.

24. The computer-readable storage medium of claim 23, further including the steps of:
determining calculated positional coordinates of the SPS server from the received SPS signals;
comparing the calculated positional coordinates of the SPS server to the known positional coordinates; and
determining the ionospheric error in response to comparing the calculated positional coordinates to the known positional coordinates.

25. The computer-readable storage storage medium of claim 24, wherein the ionospheric model includes a half cosine curve.

26. The computer-readable storage medium of claim 24, wherein the ionospheric model includes utilizing a triangle shape curve.

27. The computer-readable storage medium of claim 24, wherein the ionospheric model includes a lookup table.

28. The computer-readable storage medium of claim 23, further including the steps of:
receiving new SPS signals at the SPS server;
determining new ionospheric errors in response to receiving the new SPS signals;
comparing the new determined ionospheric errors to the predicted ionospheric error from the ionospheric model;
adjusting the ionospheric model of predicted ionospheric errors in response to the comparison outside a predetermined threshold value, the adjusted ionospheric model having adjusted ionospheric model parameters and
transmitting the adjusted ionospheric model parameters of the SPS receiver.

* * * * *

UNITED STATES PATENT AND TRADEMARK OFFICE
CERTIFICATE OF CORRECTION

PATENT NO.        : 7,741,994 B2
APPLICATION NO. : 10/504233
DATED             : June 22, 2010
INVENTOR(S)       : Ashutosh Pande et al.

It is certified that error appears in the above-identified patent and that said Letters Patent is hereby corrected as shown below:

Column 4, line 54 of the equation "$\Psi$" should be -- $\varphi$ --

Column 4, line 58 of the equation "$\Psi$" should be -- $\varphi$ --

Column 5, line 22 "$\sigma$" should be -- $\varphi$ --

Column 5, line 35 "$\sigma$" should be -- $\varphi$ --

Column 5, line 39 "$\sigma$" should be -- $\varphi$ --

Signed and Sealed this

Twenty-sixth Day of October, 2010

David J. Kappos
*Director of the United States Patent and Trademark Office*